United States Patent [19]

Davies et al.

[11] Patent Number: 5,286,469
[45] Date of Patent: Feb. 15, 1994

[54] METAL-PHOSPHORUS-NITROGEN POLYMERS, METAL-PHOSPHORUS COMPOUNDS AND METHODS OF PREPARATION THEREOF

[75] Inventors: Geoffrey Davies, Lexington, Mass.; Nagwa El-Kady, Doha, Egypt

[73] Assignee: Northeastern University, Boston, Mass.

[21] Appl. No.: 809,700

[22] Filed: Dec. 17, 1991

[51] Int. Cl.$^5$ .................. C01B 25/00; C01B 21/00
[52] U.S. Cl. ................... 423/302; 423/304; 423/305; 423/351
[58] Field of Search ............ 423/299, 302, 304, 351, 423/305

[56] References Cited

U.S. PATENT DOCUMENTS

| | | | |
|---|---|---|---|
| 2,596,935 | 5/1952 | Malowan | 423/302 |
| 3,869,294 | 3/1975 | Lanier et al. | 106/15 FP |
| 3,948,820 | 4/1976 | Reynard et al. | 260/2 P |
| 4,110,421 | 8/1978 | Dieck et al. | 423/300 |
| 4,124,567 | 11/1978 | Dieck et al. | 528/168 |
| 4,128,710 | 12/1978 | Fieldhouse et al. | 528/168 |
| 4,129,529 | 12/1978 | Fieldhouse et al. | 528/168 |
| 4,139,598 | 2/1979 | Reynard et al. | 423/300 |
| 4,157,425 | 6/1979 | Dieck et al. | 521/95 |
| 4,175,181 | 11/1979 | Hergenrother et al. | 528/168 |
| 4,223,080 | 9/1980 | Auborn | 429/194 |
| 4,258,172 | 3/1981 | Allcock et al. | 528/168 |
| 4,321,217 | 3/1982 | Allcock et al. | 260/543 PN |
| 4,374,781 | 2/1983 | Allcock et al. | 260/543 PN |
| 4,374,815 | 2/1983 | Li | 423/300 |
| 4,522,795 | 6/1985 | Li | 423/300 |
| 4,522,796 | 6/1985 | Li | 423/300 |
| 4,522,797 | 6/1985 | Pettigrew et al. | 423/300 |
| 4,522,798 | 6/1985 | Lum et al. | 423/300 |
| 4,551,317 | 11/1985 | Li | 423/300 |
| 4,945,140 | 7/1990 | Kolich et al. | 525/538 |

FOREIGN PATENT DOCUMENTS 883587 11/1961 United Kingdom ............... 423/302

OTHER PUBLICATIONS

Allcock, *Phosphorus–Nitrogen Compounds*, Academic Press, 1972 pp. 370–380.
Stone et al. *Inorganic Polymers*, Academic Press, 1962, pp. 450–453.

*Primary Examiner*—Michael Lewis
*Assistant Examiner*—Stephen G. Kalinchak
*Attorney, Agent, or Firm*—Weingarten, Schurgin, Gagnebin & Hayes

[57] ABSTRACT

The invention provides metal-phosphorus-nitrogen polymer compounds and methods for their preparation at low temperatures using readily available starting materials. One group of compounds, metal-phosphazene polymers, are comprised of repeating units of $[PN]_3$ rings linked to form polymers through P—X—M—X—P bonds. The linking atoms X are either $NH_2$ or O, and M is a metal cation. Another group of the compounds have the generic formula $M_a(P_2O_5)_b(NH_3)_cO_d \cdot eH_2O$. If the metal-phosphorus-nitrogen polymers are heated to a sufficiently high temperature to reduce the nitrogen/phosphorus ratio, additional novel solid metal phosphorus compounds of the invention are formed, many of which have a foamed, porous structure. The properties of the compounds of the invention can be varied by choice of metal and reaction conditions to create materials having useful conductive, magnetic, optical, catalytic, or ion-exchange properties.

12 Claims, No Drawings

METAL-PHOSPHORUS-NITROGEN POLYMERS, METAL-PHOSPHORUS COMPOUNDS AND METHODS OF PREPARATION THEREOF

U.S. GOVERNMENT RIGHTS TO THE INVENTION the work leading to this invention was carried out with United States Government funds. Therefore, the U.S. Government has certain rights in this invention.

FIELD OF THE INVENTION

The invention relates to solids, and more particularly to metal-phosphazene polymers and metal-phosphate compounds.

BACKGROUND OF THE INVENTION

Novel solid materials with desirable physical and chemical properties are constantly being sought for commercial applications. Economical, low temperature synthetic routes to new solids from readily available starting materials are of particular interest. Especially desirable attributes for novel materials are easy variability of physical and chemical properties and high thermal, storage and in-use stability.

One class of compounds used as starting material for new solids is the phosphazenes, compounds of the formula $(NPX_2)_n$, with alternating phosphorus and nitrogen atoms. Soluble linear chlorophosphazene, $[NPCl_2]_n$, is desirable as a primary source for making substituted phosphazene polymers (e.g., $[NP(OR)_2]_n$), many of which are useful as flame retardants and low-temperature elastomers. Solid hexachlorocyclotriphosphazene, $[NPCl_2]_3$, undergoes polymerization at 200° C.-300° C. to $[NPCl_2]_n$. The reaction is difficult to control because of cross-linking, air sensitivity, and the formation of insoluble gel products. The molecule $[NPCl_2]_3$ is a potential hexa-coordinating ligand and might be expected to react with metal salts to form cationic metal-bridged polymers, $[(ring)P—Cl—M^{II}—Cl—P(ring)]_n$, with useful properties. However, this approach does not work well in practice because $[NPCl_2]_3$ is very water-sensitive. Reaction of $[NPCl_2]_3$ with water results in formation of hydrochloric acid (HCl) which prevents formation of the metal-bridged polymer by competing protonation.

SUMMARY OF THE INVENTION

One aspect of the present invention provides novel solid metal-phosphorus-nitrogen polymers which can be made at low temperatures. In one group of compounds of the invention, repeating units of phosphazene $[PN]_3$ rings are linked by P—X—M—X—P bonds to form a polymer. The linking atoms X are either $NH_2$ or O, and M is a metal cation. Another group of the compounds have the generic formula $M_a(P_2O_5)_b(NH_3)_cO_d \cdot eH_2O$. Preferably, M is $Mg^{II}$, $Mn^{II}$, $Fe^{II}$, $Co^{II}$, $Ni^{II}$, $Cu^{II}$, or $Zn^{II}$. Compositions having $Al^{III}$, $Cr^{III}$, $Fe^{III}$, or $V^{IV}$ may also be formed. A wide range of metal-phosphorus-nitrogen polymers with various properties may thus be realized. Generally, the method of preparing the metal-bridged polymers involves reacting $[NP(NH_2)_2]_3 \cdot 6NH_4Cl$ with a metal salt in an aqueous environment, preferably either at room temperature or under reflux conditions, and isolating the precipitate.

In another aspect of the invention, the metal-phosphorus-nitrogen polymers are heated to a sufficiently high temperature to reduce the nitrogen/phosphorus ratio. The resulting solid products are novel metal-phosphorus compounds, many of which have a foamed, porous structure.

The compounds of the invention have a wide range of properties, making them appropriate for uses as diverse as fire retardants, lubricants, ion-exchangers, ingredients in glazes, and heterogenous catalysts. The proportions of the reactants, the choice of the reaction conditions, and the selection of the metal reactant will all influence the properties of the final product.

Other features and advantages of the invention will be apparent from the following description of the preferred embodiments thereof and from the claims.

DESCRIPTION OF THE PREFERRED EMBODIMENTS

The starting materials for the polymers of the invention may be phosphazenes having the formula $(NPX_2)_n$. For example, a phosphonitrilic halide such as $(NPCl_2)_3$ can be reacted with ammonia $(NH_3)$ to provide $[NP(NH_2)_2]_3 \cdot 6NH_4Cl$. The $[NP(NH_2)_2]_3 \cdot 6NH_4Cl$ product is an air-stable, white solid that is insoluble in cold water. The description of this reaction is given by R. A. Shaw in "Phosphorus and Sulfur" (1978), Vol. 4, page 101, which is incorporated herein by reference.

The phosphonitrilic compound $[NP(NH_2)_2]_3 \cdot 6NH_4Cl$ is then reacted with a metal salt in an aqueous environment to produce a metal-phosphorus-nitrogen polymer of the invention. The co-production of ammonium salts, which are only weakly acidic, permits the reaction to go to completion. As will be described in further detail below, the reaction conditions, the metal cation used, and the proportions of the initial reactants are all determinative of the molar ratios of the included elements and the specific linking atoms in the final product.

One class of products is composed of polymers having repeating units of metal-linked phosphazene $[PN]_3$ rings. The subunit of a typical metal-phosphazene polymer has the formula

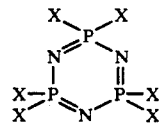

The $[PN]_3$ ring is linked to at least one other $[PN]_3$ ring through one or more $(P—X)^1—M—(X—P)^2$ bonds where the phosphorus of said $(P—X)^1$ is a member of a first $[PN]_3$ subunit and the phosphorus of said $(X—P)^2$ is a member of a second $[PN]_3$ subunit and where X is either $NH_2$ or O and where M is a metal cation. The X substituents on the phosphazene ring not involved in metal-linked bonds are in the form $NH_2$ or OH.

If the starting materials are reacted at room temperature, the products precipitating from solution have intact phosphazene rings and retain from zero to six of the original six $NH_2$ groups of the precursor phosphonitrilic compound. Different products, as determined by elemental analysis, usually having different properties from those formed at room temperature, are formed from the same precursors if the reaction takes place at higher temperatures. In general, as the reaction temperature is increased from room temperature to 100° C. (reflux conditions), the nitrogen content (and, therefore, the ratio N/P) of the product polymer is decreased.

A different class of products, novel metal-phosphorus compounds, is produced if the products prepared in the original reaction are heated to a high temperature, e.g., about 600° C. The products of high temperature treatment have considerably reduced to no nitrogen content, and a number of them are unusual foamed, or porous, materials.

The descriptions and charts below give sample reaction conditions and products formed for a broad spectrum of metal systems.

EXAMPLE I—ROOM TEMPERATURE PROCEDURE

The reactants are generally the phosphonitrilic compound, e.g., $[NP(NH_2)_2]_3 \cdot 6NH_4Cl$ (A) and a metal salt (usually the halide, nitrate or, preferably, the sulfate hydrate) (B) and distilled water. In a typical experiment, 5.5 gm (0.01 mol) of A is treated with 0.01 mol of B in 100 mL of distilled water, and the mixture is stirred at room temperature for 24 hr. The precipitated product is filtered, washed several times with water and methanol and then air dried. No precipitate is obtained with common magnesium or nickel salt hydrates at room temperature. The colors, yields and analytical data of the precipitated solids are shown in Table I.

phazene rings $[PN]_3$. From zero to six of the original six $NH_2$ groups of the phosphonitrilic compound (A) remain in the products. Only two products (those containing V and Fe) have six $NH_2$ groups and these products have the highest formula weights. Each phosphazene ring generally coordinates from two to four metal units. Exceptions are the products containing Mn (where one metal unit coordinates two phosphazene rings ), Cr (1.7 Cr per phosphazene ring) and Zn (1.5 Zn per phosphazene ring). The highest yields (lowest solubility) are observed for the Al and Cr products, which are $M^{III}$ systems. With the notable exceptions of Co (0.33) and Mn (14), the room temperature products contain from three to nine water molecules per metal center.

EXAMPLE II—REFLUX PROCEDURE

In a typical experiment, 5.5 gm (0.01 mol) of solid compound (a) described above and 100 mL of distilled water are placed in a 250 mL round bottom flask fitted with a reflux condenser. An equimolar amount of solid metal salt (B) is added and the mixture is refluxed for two hr. After the mixture is cooled to room temperature, the precipitated solid is filtered and washed several times with water and methanol and then air-dried. The colors, yields and analytical data of the precipitated

TABLE I

Room Temperature Products
Formula $M_a[(PN)_3O_b(OH)_c(NH_2)_d]_e \cdot fH_2O$

| M | Color | Yield[2] | a | b | c | d | e | f | Anal. (%)[1] M | P | N | Molar Ratios N/P | N/M | Solubility in 0.1N HCl Cold | Hot | Solubility in 0.1N NaOH Cold | Hot |
|---|---|---|---|---|---|---|---|---|---|---|---|---|---|---|---|---|---|
| Al(OH)$_2$ FW[3] 708 | White powder | 4.03 | 3 | 3 | 0 | 3 | 1 | 19 | 10.9 11.4 | 14.2 13.1 | 11.6 11.4 | 1.8 | 2.1 | Insol. | S. sol. | Insol. | Insol. |
| Co(OH) FW[3] 477 | Pink powder | 0.43 | 3 | 3 | 0 | 3 | 1 | 1 | 41.8 37.1 | 17.9 19.5 | 16.6 17.6 | 2.1 | 1.7 | Insol. | Insol. | Insol. | S. sol. blue |
| Cr FW[3] 1554 | Green powder | 3.00 | 5 | 5 | 1 | 0 | 2 | 35 | 16.9 16.7 | 17.5 17.9 | 8.1 8.1 | 1.0 | 1.8 | Insol. | Insol. | Insol. | Insol. |
| Cu FW[3] 484 | Greenish blue powder | 1.88 | 2 | 4 | 0 | 2 | 1 | 7 | 28.2 26.2 | 19.1 19.2 | 13.4 14.4 | 1.6 | 2.2 | Insol. | Insol. | Insol. | S. sol. blue |
| Fe(OH)$_2$ FW[3] 974 | Khaki powder | 1.54 | 4 | 0 | 0 | 6 | 1 | 22 | 21.1 22.9 | 9.4 9.6 | 14.2 12.9 | 3.3 | 2.7 | Insol. | Insol. | S. sol. | Changed to brown ppt. |
| Mn FW[3] 773 | Cream powder | 0.16 | 1 | 1 | 2 | 3 | 2 | 14 | 7.0 7.1 | 24.0 24.1 | 21.1 21.7 | 1.9 | 11.8 | Insol. | Insol. | S. sol. | Changed to brown ppt. |
| VO(OH)$_2$ FW[3] 1283 | Gray-green powder | 2.60 | 4 | 0 | 0 | 6 | 1 | 36 | 16.4 15.9 | 7.4 7.2 | 9.2 9.8 | 2.8 | 2.1 | Insol. | S. sol. bluish violet | S. sol. | Sol. reddish brown |
| Zn FW[3] 782 | White powder | 1.64 | 3 | 3 | 2 | 2 | 2 | 10 | 23.5 25.1 | 24.8 23.8 | 18.9 17.9 | 1.7 | 3.8 | Sol. | Ppted when heated | Insol. | Insol. |

[1]Second row of each entry shows the calculated elemental percentages.
[2]Typical yield (gm) under standard experimental conditions.
[3]Calculated formula weight of product.

From the data given in Table I it can be seen that all the tested room temperature products have an N/P molar ratio $\geq 1.0$, implying the presence of intact phosphazene rings. Solids prepared by the reflux procedure are shown in Table II.

TABLE II

Reflux Temperature Products
Formula $M_a(P_2O_5)_b(NH_3)_c O_d \cdot eH_2O$

| M | Color | Yield[2] | a | b | c | d | e | Anal. (%)[1] M | P | N | Molar Ratios N/P | N/M | Solubility in 0.1N HCl Cold | Hot | Solubility in 0.1N NaOH Cold | Hot |
|---|---|---|---|---|---|---|---|---|---|---|---|---|---|---|---|---|
| Al FW[3] 2317 | White powder | 3.79 | 10 | 7 | 11 | 15 | 35 | 11.4 11.4 | 18.8 18.3 | 6.5 6.5 | 0.77 | 1.1 | Insol. | S. sol. | Sol. | Sol. |
| Co FW[3] 2020 | Lavender powder | 2.72 | 15 | 5 | 11 | 15 | 0 | 47.1 43.7 | 16.9 15.3 | 8.5 7.6 | 1.1 | 0.77 | S. sol. pink | Ppted when heated | Insol. | Insol. |
| Cr FW[3] 1788 | Green powder | 4.71 | 6 | 5 | 8 | 9 | 27 | 17.1 17.4 | 17.7 17.1 | 6.2 6.3 | 0.77 | 1.3 | Insol. | Insol. | Insol. | Insol. |
| Cu FW[3] 10037 | Pale blue powder | 2.19 | 63 | 21 | 22 | 63 | 93 | 40.2 40.0 | 13.0 13.0 | 3.0 3.1 | 0.52 | 0.34 | Sol. blue | Sol. blue | Insol. | Insol. change to black |

TABLE II-continued

Reflux Temperature Products
Formula $M_a(P_2O_5)_b(NH_3)_cO_d \cdot eH_2O$

| M | Color | Yield[2] | a | b | c | d | e | Anal. (%)[1] M | P | N | Molar Ratios N/P | N/M | Solubility in 0.1N HCl Cold | Hot | Solubility in 0.1N NaOH Cold | Hot |
|---|---|---|---|---|---|---|---|---|---|---|---|---|---|---|---|---|
| Fe FW[3] 2998 | Yellow-brown powder | 4.40 | 14 | 4 | 15 | 14 | 65 | 26.8 26.1 | 8.5 8.3 | 6.9 7.0 | 1.8 | 1.1 | Insol. | Insol. | S. sol. brown | S. sol. dark brown |
| Mg FW[3] 2875 | White powder | 1.13 | 10 | 12 | 24 | 10 | 20 | 8.2 8.4 | 26.4 25.8 | 11.9 11.7 | 0.96 | 2.4 | S. sol. | S. sol. | Insol. | Insol. |
| Mn FW[3] 1880 | Pale pink powder | 2.09 | 4 | 7 | 17 | 4 | 17 | 11.6 11.7 | 22.9 23.1 | 12.7 12.7 | 1.2 | 4.3 | S. sol. | White ppt. when heated | Insol. - changed to brown ppt. | Changed to brown ppt. |
| Ni FW[3] 2623 | Pale green powder | 2.02 | 10 | 7 | 18 | 10 | 32 | 22.4 22.4 | 16.4 16.5 | 9.8 9.6 | 1.3 | 1.8 | Sol. | Sol. | Insol. | Insol. |
| V FW[3] 8412 | Pale blue powder | 2.53 | 43 | 5 | 16 | 86 | 212 | 25.9 26.0 | 3.6 3.7 | 2.7 2.7 | 1.6 | 0.37 | Sol. blue | Sol. blue | S. sol. | Sol. reddish brown |
| Zn Fw[3] 1424 | White powder | 2.17 | 6 | 4 | 10 | 6 | 11 | 27.6 27.5 | 17.3 17.4 | 9.9 9.8 | 1.3 | 1.7 | Sol. | Turbid when heated | S. sol. | S. sol. |

[1]Second row of each entry shows the calculated elemental percentages.
[2]Typical yield (gm) under standard experimental conditions.
[3]Calculated formula weight of product.

From the data presented in Table II it can be observed that precipitated products are obtained under reflux conditions with Mg and Ni salts as reactants whereas these two metals do not lead to precipitated products at room temperatures. The product N/P ratio is always lower under reflux conditions than at room temperature, indicating that a higher reaction temperature favors the hydrolysis of $NH_2$ substituents on the phosphazene ring. This is substantiated by lower N/M molar ratios under reflux conditions.

With three exceptions, the N/P ratio varies between 0.96 (Mg) and 1.8 (Fe) under reflux. In this range, the pattern of variation of N/P with metal is similar to that at room temperature. Since the intact phosphazene ring has N/P=1.0 when all the $NH_2$ groups have been hydrolyzed to OH groups, most of the products appear to contain intact PN rings. On this basis, those with N/P>1.0 have one or two residual $NH_2$ groups per phosphazene ring. The notable exceptions are the products prepared from Al and Cr (N/P=0.77) and Cu (N/P=0.52). These products evidently contain hydrolyzed PN rings. The calculated formula weights under reflux are higher than at room temperature, consistent with a higher degree of hydrolysis and polymerization. This is consistent with polymerization through M—O linkages. The products under reflux conditions always contain fewer water molecules of crystallization per metal center than those obtained at room temperature. Aside from the above analytical differences, a number of the products formed under reflux conditions have different acid/base solubility properties from those products prepared from the same metal at room temperature. For example, the product obtained at reflux with aluminum is soluble in cold 0.1 M NaOH while the product obtained at room temperature is insoluble.

EXAMPLE III—HIGH TEMPERATURE PROCEDURE

A solid sample (typically 100 mg) of each precipitate obtained from the room temperature or reflux procedure is heated in air in a porcelain or glass crucible from room temperature to 600° C. in 15 min, held at 600° for 3 hr, and then allowed to cool to room temperature in the oven (typically 2 hr). The colors and analytical data for the solid products obtained on standing at room temperature are shown in Tables III and IV.

TABLE III

High Temperature Products
(prepared from room temperature products)

| M | Color of Product |
|---|---|
| Al | White powder |
| Co | Blue foamed hard lumps |
| Cr | Gray brown sof powder |
| Cu | Foamed pale-green solid |
| Fe | Off-white chalky chunks |
| Mn | Hard off-white mass |
| V | Shiny hard green-gold solid |
| Zn | Gray hard solid |

TABLE IV

High Temperature Products
(prepared from reflux products)

| Product | Color | FW[2] | Anal. (%)[1] M | P | N |
|---|---|---|---|---|---|
| AlPO$_4$ | White powder | 244 | 21.7 22.1 | 20.9 25.4 | 0 0 |
| CO$_{22}$(P$_3$O$_2$)$_5$ | Foamed blue solid | 1921 | 65.6 67.5 | 24.2 24.2 | 0 0 |
| Cr$_2$(P$_2$O$_5$)$_2$O$_3$.13H$_2$O | Brown powder | 770 | 14.0 13.5 | 15.7 16.1 | 0 0 |
| Cu$_3$(PO$_2$)$_3$ | Blue-green powder | 381 | 47.0 50.1 | 17.1 16.3 | 0 0 |
| Fe$_3$(PO$_4$)$_2$.8H$_2$O | Foamed yellow solid | 501 | 33.9 33.3 | 12.6 12.4 | 0 0 |
| Mg$_2$(PO$_3$)$_5$ | Hard white mass | 444 | 11.1 11.0 | 33.4 34.9 | 0 0 |
| Mn(P$_2$O$_5$)$_2$N.7H$_2$O | Foamed off-white solid | 479 | 10.7 11.5 | 27.8 25.9 | 3.1 2.9 |
| Ni$_3$(P$_2$O$_5$)$_2$N.4H$_2$O | Tan, chunky, soft solid | 546 | 31.6 32.2 | 23.0 22.7 | 2.9 2.6 |
| (VO)$_8$(PO$_4$)$_2$O$_5$.9H$_2$O | Foamed hard black beads | 967 | 41.1 42.1 | 6.4 6.4 | 0 0 |
| Zn$_{11}$(PO$_3$)$_{10}$ | Hard gray solid | 1509 | 49.5 47.6 | 21.8 20.5 | 0 0 |

[1]Second line in each entry shows calculated elemental analysis.
[2]Calculated.

As can be seen from the analytical data presented in Table IV, heating precipitates from reflux experiments at 600 ° C. for three hours gives orthophosphate products only with Al, Fe and V. All other products are unusual phosphorus-containing compounds. Only two products (Mn and Ni) contain any detectable N. The pattern of variation of the molar P/M ratio in the products is similar to that of the materials that are heated. This means that the formulas and properties of the high temperature products are set by choice of the precursors, as is illustrated further by the data presented in Tables V and VI. Of particular practical importance is the synthesis of foamed (porous) materials in several metal systems.

TABLE V

Comparison of High Temperature Products from Precursors Made at Room and Reflux Temperatures

| Material Heated | Product | Color | FW[2] | Anal. (%)[1] M | P |
|---|---|---|---|---|---|
| $Cu_{63}(P_2O_5)_{21}(NH_3)_{22}O_{63} \cdot 93H_2O$[3] | $Cu_2(PO_2)_3$ | Foamed pale green solid | 316 | 37.7 | 27.7 |
|  |  |  |  | 40.2 | 29.4 |
| $Cu_2[(PN)_3O_4(NH_2)_2] \cdot 7H_2O$[4] | $Cu_3(PO_4)_2$ | Blue-green powder | 381 | 47.0 | 17.1 |
|  |  |  |  | 50.1 | 16.3 |

[1]Second line of each entry gives calculated elemental data for assigned product.
[2]Calculated.
[3]Obtained at reflux temperature (see Table II).
[4]Obtained at room temperature (see Table I).

TABLE VI

Comparison of High Temperature Products from Precursors Made at Room and Reflux Temperatures

| Element | Product[1] | Product[2] |
|---|---|---|
| Fe | Off-white chalky chunks | Foamed yellow solid |
| Mn | Hard, off-white solid | Foamed off-white solid |
| V | Shiny, hard green-gold solid | Foamed, hard black beads |

[1]Precursor made at room temperature.
[2]Precursor made at reflux temperature.

Products obtained at room temperature or reflux exhibit extremely weak X-ray powder patterns, indicating that they are amorphous. The main effects of treatment at 600° C. are sharpening of $\nu_{P-O}$ ir bands, the appearance of strong $\nu_{M-O}$ bands (at ca. 600 cm$^{-1}$ for $M^{II}$ and 1100 cm$^{-1}$ for $V^{IV}$), and the appearance of sharp X-ray powder diffraction peaks, indicating crystallization.

The novel solids according to the invention have a wide range of uses depending on their specific properties. For example, the foamable compounds are fire resistant and are useful replacements for organic phosphazenes. Some of the materials, e.g., the high temperature Cr compound and the Ni compound prepared under reflux conditions, are slippery and can be used as lubricants. Protective or lubricant coatings can be formed from those products soluble in acid or base. The high temperature products are useful as metal containing fillers for polymers or copolymers or as metalizing agents for refractory materials. Heated samples can be pelletized, making some products suitable for conductivity and optical measurements. Others are possible supports for metal, alloy and mixed-metal oxide catalysts.

Treatment of a suspension of the colorless Al or Zn compounds prepared at room temperature with a molar deficit of copper(II) sulfate in water at room temperature gives a colorless solution and blue solids, the intensity of color increasing with the amount of copper (II) in the treatment solution. Thus, aluminum and zinc in the metal-phosphazene products easily can be ion-exchanged with copper (and, presumably, with other $M^{II}$ ions) that form stronger bonds to the phosphazene rings than aluminum and zinc, from doping levels up to the level of complete metal replacement. This suggests useful ion-exchange applications, for example in high performance liquid chromatography, in water treatment, and in precious metal recovery from process streams.

Of special interest are the extensive decorative possibilities for using the compounds of the invention. For example, glazes can be prepared for porous glasses, e.g., from the vanadium compound, or metal components can be added to a ceramic body, either to the fired ceramic or to the slip as a reactive component. The product prepared from zinc at room temperature can be drawn into metallated fibers.

Other embodiments of the invention will be apparent to those skilled in the art from a consideration of this specification or practice of the invention disclosed herein. It is intended that the specification and the examples be considered as exemplary only, with the true scope and spirit of the invention being indicated by the following claims.

What is claimed is:

1. A solid metal-phosphazene polymer compound comprising a phosphazene [PN]$_3$ subunit having the formula

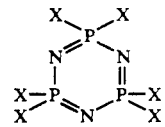

wherein
said [PN]$_3$ subunit is linked to at least one other [PN]$_3$ subunit through one or more (P—X)$^1$—M—(X—P)$^2$ bonds where the phosphorus of said (P—X)$^1$ is a member of a first [PN]$_3$ subunit and the phosphorus of said (X—P)$^2$ is a member of a second [PN]$_3$ subunit, X is either NH$_2$ or O and where M is a metal unit; and wherein
the X substituents not linked in (P—X)$^1$—M—(X—P)$^2$ bonds are NH$_2$ or OH.

2. A method for preparation of a solid metal-phosphorus-nitrogen compound comprising the steps of:
providing hexaminocyclotriphosphazene, [NP(NH$_2$)$_2$]$_3 \cdot$6NH$_4$Cl;
reacting said [NP(NH$_2$)$_2$]$_3 \cdot$6NH$_4$Cl with a metal salt in an aqueous environment; and
isolating the reaction product as a precipitate.

3. The method of claim 2 wherein the step of providing [NP(NH$_2$)$_2$]$_3 \cdot$6NH$_4$Cl further comprises reacting [NPCl$_2$]$_3$ with ammonia to obtain [NP(NH$_2$)$_2$]$_3 \cdot$6NH$_4$Cl.

4. The method of claim 2 wherein the metal of the metal salt of the reacting step is selected from the group consisting of $Mg^{II}$, $Mn^{II}$, $Fe^{II}$, $Co^{II}$, $Ni^{II}$, $Cu^{II}$, $Zn^{II}$, $Al^{III}$, $Cr^{III}$, $Fe^{III}$, and $V^{IV}$.

5. The method of claim 2 wherein the metal salt of the reacting step is selected from the group consisting of halides, nitrates, and sulfates.

6. The method of claim 2 wherein the reacting step comprises refluxing $[NP(NH_2)_2]_3 \cdot 6NH_4Cl$ with a metal salt and water.

7. The method of claim 2 wherein the reacting step comprises treating $[NP(NH_2)_2]_3 \cdot 6NH_4Cl$ with a metal salt and water at room temperature.

8. The method of claim 2 further comprising the subsequent step of washing the precipitate with water.

9. The method of claim 8 further including a subsequent drying step.

10. The product prepared by the method of claim 2.

11. The product prepared by the method of claim 6.

12. The product prepared by the method of claim 7.

* * * * *

UNITED STATES PATENT AND TRADEMARK OFFICE
CERTIFICATE OF CORRECTION

PATENT NO. : 5,286,469
DATED : February 15, 1994
INVENTOR(S) : Geoffrey Davies, et al Page 1 of 2

It is certified that error appears in the above-indentified patent and that said Letters Patent is hereby corrected as shown below:

On the Title page, line [75], "Inventors: Geoffrey Davies, Lexington, Mass.; Nagwa El-Kady, Doha, Egypt" should read --Inventors: Geoffrey Davies, Lexington, Mass.; Nagwa El-Kady, Doha, Qatar; and Ahmed El-Toukhy, Doha, Qatar--. The Original Grant is enclosed per your request. Please correct the cover of the Original Grant and forward the corrected copy to our office.

Column 1, line 8, "the work leading" should read --Part of the work leading--.

Column 3, line 58, "molar ratio $\geq$ 1.0," should read --molar ratio $>$ 1.0,--.

Column 4, line 18, "compound (a)" should read --compound (A)--.

Column 6, Table III, "Gray brown sof powder" should read --Gray brown soft powder--.

UNITED STATES PATENT AND TRADEMARK OFFICE
CERTIFICATE OF CORRECTION

PATENT NO. : 5,286,469
DATED : February 15, 1994
INVENTOR(S) : Geoffrey Davies, et al It is certified that error appears in the above-indentified patent and that said Letters Patent is hereby corrected as shown below:

Column 7, line 4, Table V, "$CU_2(PO_2)_3$" should read --$CU_3(PO_2)_3$--.

Signed and Sealed this

Sixth Day of September, 1994

Attest:

BRUCE LEHMAN

Attesting Officer

Commissioner of Patents and Trademarks